March 24, 1959  E. A. STALKER  2,879,028
COOLED TURBINE BLADES
Filed March 31, 1954

INVENTOR.
Edward A. Stalker

United States Patent Office 2,879,028
Patented Mar. 24, 1959

2,879,028

COOLED TURBINE BLADES

Edward A. Stalker, Bay City, Mich.

Application March 31, 1954, Serial No. 419,952

5 Claims. (Cl. 253—39.15)

This invention relates to blades for turbines and particularly for gas turbines.

An object of the invention is to provide means for economically cooling a turbine blade.

Another object is to provide a cooled turbine blade wherein the porous external wall of the blade is provided with a properly proportioned flow of coolant.

Other objects will appear from the appended specification, drawings and claims.

The above objects are accomplished by the means illustrated in the accompanying drawings in which—

Figure 2:
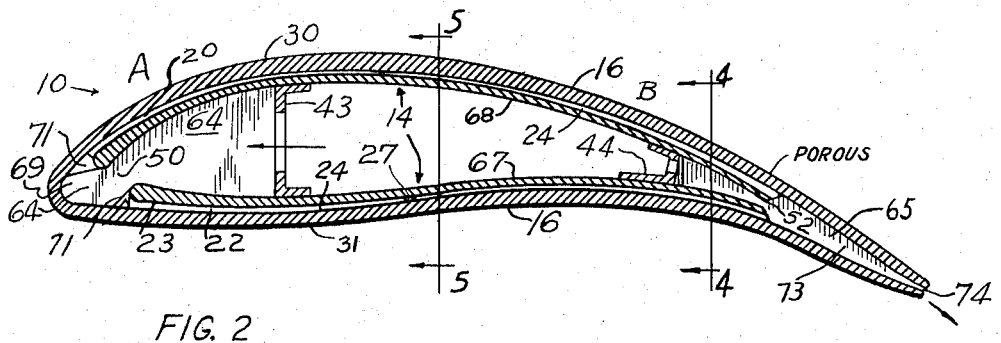
Fig. 2 is a section on line 2—2 in Fig. 1.
Figure 3:
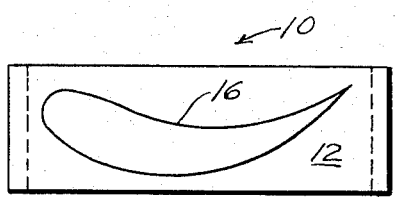
Fig. 3 is a tip end view of the blade in Fig. 1.

Referring now to the drawings the blade is indicated generally as 10. It is comprised of the base 12, the stem 14 and the porous skin 16.

The stem has the chordwise splines 20 and 22 spaced apart spanwise as shown in Figs. 1–5 which serve to support the skin at spanwise spaced localities so that the root sections of the skin do not have to carry the centrifugal load of all the outward portions of the skin. These splines also direct the flow of coolant chordwise in the flutes 23 between the splines.

The skin has chordwise groove 24 which register with the splines of the stem. See Figs. 4–8.

Figure 7:
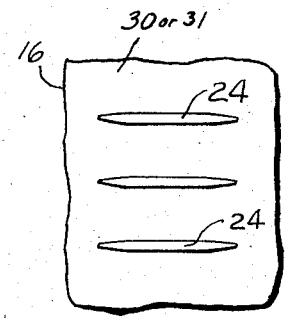
Fig. 7 is a fragment of the skin showing the grooves.
Figure 8:
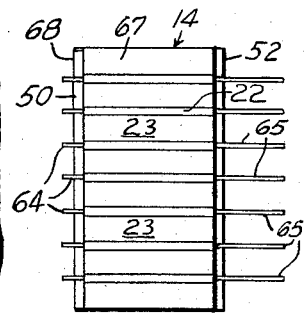
Fig. 8 is a side view of the stem.
Figure 4:
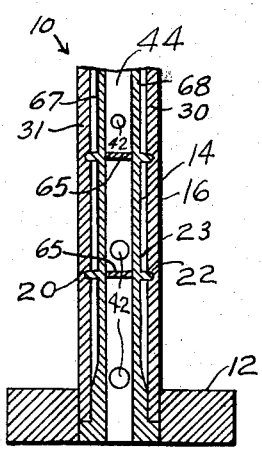
Fig. 4 is a section on line 4—4 in Fig. 2.
Figure 5:
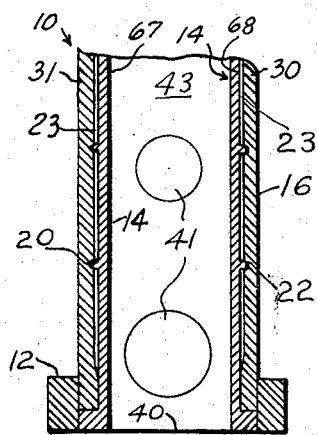
Fig. 5 is a section on line 5—5 in Figs. 1 and 2.
Figure 1:
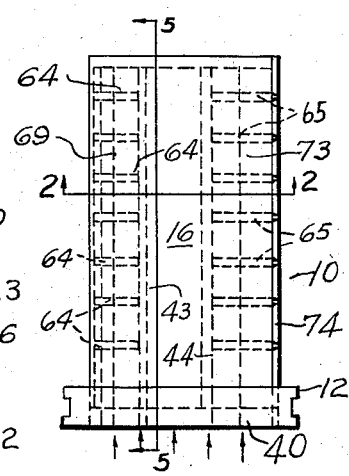
Fig. 1 is a side elevation of a cooled gas turbine blade.

It will be observed from Figs. 2, 4 and 5 that the convex part 30 of the skin 16 increases in thickness from the leading edge to about the mid-chord locality producing a corresponding change in the resistance to the flow of a cooling fluid therethrough. At the forward edge of the stem the skin is preferably spaced from the stem by about the thickneess of the splines. At the middle portion of the blade the skin is relatively close to the stem surface between the splines. That is, the clearance between the stem and skin is a minimum. Thus the splines of the stem bear on the sides of the grooves from about the locality A to the locality B. Fig. 7 shows how the grooves in the skin fair out at their ends near the chordwise ends of the stem.

The part 31 of the skin is generally concave and is preferably spaced about the same distance from the stem at all points and is supported by the splines 22.

A baffle 27 extending spanwise may be used as shown at 27 in Fig. 2. Such baffles facilitate the division of the coolant between the front or leading, and the rear or trailing, portions of the blade.

On the convex or upper surface of the blade the external static pressure decreases rearward from the nose or front to the middle portion of the blade so that with a constant pressure in the stem, too much coolant would tend to flow through the middle portions of the skin relative to the nose and tail portions. By increasing the thickness of the upper or convex part 30 of the skin toward the central part of the blade from each edge and by decreasing the depth of each flute 23, a desirable distribution of coolant flow through the skin is obtained.

On the under or concave surface of the blade the external static pressure is substantially constant and little or no variation in the skin thickness or flute depth is required.

Coolant is supplied through the opening 40 in the base 12 into the interior of the stem. The opening means or sets of holes 41 and 42 in the partitions or spars 43 and 44 respectively serve to control the distribution of the coolant spanwise. The holes decrease in size tipward so that the increasing centrifugal pressure does not direct too much of the coolant to the tip portions of the skin. These portions may be permitted to run hotter than the inner portions because the stresses in them are lower.

The coolant flows chordwise out of the stem openings 50 and 52 into the flutes 23 or spaces between the splines and is emitted through the porous skin 16. From the openings 50 and 52 the coolant flows in the flutes toward the middle portions of the blades.

Figure 6:
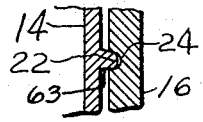
Fig. 6 is an enlarged fragment of the blade to illustrate the supporting splines and grooves.

As shown in Fig. 6 to an enlarged scale one side 63 of each spline is preferably inclined slightly toward the base of the blade so that there is an inclined plane action forcing the skin toward the stem under the action of centrifugal force on the skin.

The spacers 64 and 65 held between the upper or convex wall 68 and the lower or concave wall 67 of the stem (Fig. 2) restrain the tendency of the coolant to flow spanwise in the spaces 69 and 73 respectively at the nose and tail of the blade. However some small spanwise flow is preferably permitted through small gaps like 71.

The spacers 65 tie the convex and concave parts of skin 16 together at the trailing edge.

Some of the coolant from the space 73 preferably flows out the trailing edge openings 74.

It will now be clear that I have provided a simple and effective means of controlling the volume flow of coolant through different parts of the porous blade skin.

While I have illustrated specific forms of the invention, it is to be understood that variations may be made therein and that I intend to claim my invention broadly as indicated by the appended claims.

I claim:

1. In combination in a turbine blade adapted to be bathed on the outside surfaces thereof by a hot fluid in a turbine, a hollow stem adapted to be supplied with a flow of coolant, and a porous skin enclosing said stem and spaced outward therefrom, said stem extending along a major portion of the chord and of the spanwise length of said blade, said stem having a plurality of splines fixed thereon with their major lengths extending in the chordwise direction and being spaced apart spanwise with flutes therebetween, said skin being secured to said splines for support of said skin against centrifugal force at a plurality of spanwise spaced localities, said stem having openings affording communication between the hollow interior thereof and said flutes for conducting flows of coolant to said flutes between said skin and said stem for flow outward through said porous skin, said skin having a lesser thickness along portions thereof adjacent the ends of said blade where the outside fluid pressure is greater and having a greater thickness toward the central part of said blade where the outside fluid pressure is less to thereby secure a controlled distribution of the flow through said skin for cooling the same.

2. In combination in a turbine blade adapted to be bathed on the outside surfaces thereof by a hot fluid in a turbine, a hollow stem adapted to be supplied with a flow of coolant, and a porous skin enclosing said stem and spaced outward therefrom, said stem extending along a major portion of the chord and of the spanwise length of said blade, said stem having a plurality of splines fixed thereon with their major lengths extending in the chordwise direction and being spaced apart spanwise with flutes therebetween, said skin being secured to said splines for support of said skin against centrifugal force at a plurality of spanwise spaced localities, said skin being spaced outward at distances from said stem decreasing from a locality adjacent a chordwise end of said stem toward the central part thereof, said stem having openings affording communication between the hollow interior thereof and said flutes for conducting flows of coolant to said flutes between said skin and said stem for flow outward through said porous skin, said skin having a lesser thickness along portions thereof adjacent the ends of said blade where the outside fluid pressure is greater and having a greater thickness toward the central part of said blade where the outside fluid pressure is less to thereby secure a controlled distribution of the flow through said skin for cooling the same.

3. In combination in a turbine blade adapted to be bathed on the outside surfaces thereof by a hot fluid in a turbine, a hollow stem adapted to be supplied with a flow of coolant, and a porous skin enclosing said stem and spaced outward therefrom, said stem extending along a major portion of the chord and of the spanwise length of said blade, said stem having a plurality of splines fixed thereon with their major lengths extending in the chordwise direction and being spaced apart spanwise forming flutes therebetween for conducting a fluid flow, said skin being secured to said splines for support of said skin against centrifugal force at a plurality of spanwise spaced localities, said flutes being open at the chordwise ends thereof, means establishing communication between said flutes and the hollow interior of said stem for conducting flows of coolant to said flutes between said skin and said stem for flow outward through said porous skin, said skin having a lesser thickness along portions thereof adjacent the ends of said blade where the outside fluid pressure is greater and having a greater thickness toward the central part of said blade where the outside fluid pressure is less to thereby secure a controlled distribution of the flow through said skin for cooling the same.

4. In combination in a turbine blade adapted to be bathed on the outside surfaces thereof by a hot fluid in a turbine, a hollow stem adapted to be supplied with a flow of coolant, and a porous skin enclosing said stem and spaced outward therefrom, said stem extending along a major portion of the chord and of the spanwise length of said blade, said stem having a plurality of splines fixed thereon with their major lengths extending in the chordwise direction and being spaced apart spanwise with flutes therebetween, spars extending spanwise within said hollow stem, said spars having apertures therein of decreasing size tipward to control the distribution of the fluid flow spanwise therein, said skin being secured to said splines for support of said skin against centrifugal force at a plurality of spanwise spaced localities, said stem having openings affording communication between the hollow interior thereof and said flutes for conducting flows of coolant to said flutes between said skin and said stem for flow outward through said porous skin, said skin having a lesser thickness along portions thereof adjacent the ends of said blade where the outside fluid pressure is greater and having a greater thickness toward the central part of said blade where the outside fluid pressure is less to thereby secure a controlled distribution of the flow through said skin for cooling the same.

5. In combination in a turbine blade adapted to be bathed on the outside surfaces thereof by a hot fluid in a turbine, a hollow stem adapted to be supplied with a flow of coolant, and a porous skin enclosing said stem and spaced outward therefrom, said stem extending along a major portion of the chord and of the spanwise length of said blade, said stem having a plurality of splines fixed thereon with their major lengths extending in the chordwise direction and being spaced apart spanwise with flutes therebetween, said skin engaging said splines for support of said skin against centrifugal force at a plurality of spanwise spaced localities, said stem having means affording communication between the hollow interior thereof and said flutes for conducting flows of coolant to said flutes between said skin and said stem for flow outward through said porous skin, said skin having a lesser thickness providing a lesser resistance to flow therethrough along portions thereof adjacent the ends of said blade where the outside fluid pressure is greater and having a greater thickness providing a greater resistance to flow toward the central part of said blade where the outside fluid pressure is less to thereby secure a controlled distribution of the flow through said skin for cooling the same.

References Cited in the file of this patent

UNITED STATES PATENTS

| | | |
|---|---|---|
| 2,648,520 | Schmitt | Aug. 11, 1953 |
| 2,665,881 | Smith | Jan. 12, 1954 |

FOREIGN PATENTS

| | | |
|---|---|---|
| 491,903 | Canada | Apr. 7, 1953 |
| 619,634 | Great Britain | Mar. 11, 1949 |
| 869,427 | France | Nov. 7, 1941 |
| 1,007,303 | France | Feb. 6, 1952 |